US011297376B2

(12) United States Patent
Fang et al.

(10) Patent No.: US 11,297,376 B2
(45) Date of Patent: *Apr. 5, 2022

(54) SET-TOP BOX WITH INTERACTIVE FEATURES AND SYSTEM AND METHOD FOR USE OF SAME

(71) Applicant: Enseo, LLC, Plano, TX (US)

(72) Inventors: William C. Fang, Plano, TX (US); Thomas R. Miller, Plano, TX (US); Vanessa Ogle, Fairview, TX (US)

(73) Assignee: Enseo, LLC, Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/317,652

(22) Filed: May 11, 2021

(65) Prior Publication Data
US 2021/0266627 A1     Aug. 26, 2021

Related U.S. Application Data

(63) Continuation of application No. 16/933,604, filed on Jul. 20, 2020, now Pat. No. 11,006,170, which is a
(Continued)

(51) Int. Cl.
*H04N 21/431*     (2011.01)
*H04N 21/436*     (2011.01)
(Continued)

(52) U.S. Cl.
CPC ....... *H04N 21/431* (2013.01); *H04N 21/4131* (2013.01); *H04N 21/41265* (2020.08);
(Continued)

(58) Field of Classification Search
CPC ........... H04N 21/431; H04N 21/41265; H04N 21/4131; H04N 21/436; H04N 21/44231;
(Continued)

(56) References Cited

U.S. PATENT DOCUMENTS 5,661,517 A     8/1997  Budow et al.
5,664,174 A     9/1997  Agrawal et al.
(Continued)

OTHER PUBLICATIONS

Junghak Kim, Seungchul Kim, Sangtaick Park and Jinwoo Hong, "Home appliances controlling through Smart TV set-top box with screen-mirroring remote controller," 2013 International Conference on ICT Convergence (ICTC), 2013, pp. 1009-1012, doi: 10.1109/ICTC.2013.6675541. (Year: 2013).*
(Continued)

*Primary Examiner* — Cynthia M Fogg
(74) *Attorney, Agent, or Firm* — Scott Griggs; Griggs Bergen LLP

(57) ABSTRACT

A set-top box with interactive features and system and method for use of the same are disclosed. In one embodiment of the set-top box, the set-top box receives various types of set-top box data such as information about display-based interactions with the set-top box, information about a plurality of amenities on a residential property co-located with the set-top box, and information from a proximate wireless-enabled interactive programmable device interacting with the set-top box. The set-top box may render a map view of the property based on obtained map data. The map view may include an interactive graphical representation of the residential property and be annotated with at least a portion of the set-top box data.

20 Claims, 8 Drawing Sheets

Related U.S. Application Data continuation of application No. 16/138,699, filed on Sep. 21, 2018, now Pat. No. 10,721,518.

(60) Provisional application No. 62/561,963, filed on Sep. 22, 2017.

(51) Int. Cl.
*H04N 21/81* (2011.01)
*H04N 21/41* (2011.01)
*H04N 21/472* (2011.01)
*H04N 21/442* (2011.01)

(52) U.S. Cl.
CPC ....... *H04N 21/436* (2013.01); *H04N 21/4424* (2013.01); *H04N 21/44231* (2013.01); *H04N 21/472* (2013.01); *H04N 21/8146* (2013.01)

(58) Field of Classification Search
CPC ............. H04N 21/4424; H04N 21/472; H04N 21/8146; H04N 21/4126; H04N 21/44222
USPC .......................................................... 725/37
See application file for complete search history.

(56) References Cited

U.S. PATENT DOCUMENTS

| | | | |
|---|---|---|---|
| 5,675,788 A | 10/1997 | Husick et al. | |
| 5,742,816 A | 4/1998 | Barr et al. | |
| 5,842,200 A | 11/1998 | Agrawal et al. | |
| 6,029,176 A | 2/2000 | Cannon | |
| 6,286,005 B1 | 9/2001 | Cannon | |
| 9,088,828 B2 | 7/2015 | Ogle et al. | |
| 9,326,009 B2 | 4/2016 | Ogle et al. | |
| 9,560,388 B2 | 1/2017 | Ogle et al. | |
| 9,832,489 B2 | 11/2017 | Ogle et al. | |
| 10,721,518 B2 | 7/2020 | Fang et al. | |
| 2002/0184623 A1 | 12/2002 | Hodge et al. | |
| 2007/0112939 A1 | 5/2007 | Wilson et al. | |
| 2007/0192486 A1 | 8/2007 | Wilson et al. | |
| 2013/0328909 A1 | 12/2013 | Pacheco et al. | |
| 2016/0335423 A1* | 11/2016 | Beals ................. | H04L 12/2803 |
| 2017/0083268 A1 | 3/2017 | Cho et al. | |
| 2017/0105095 A1 | 4/2017 | Um et al. | |
| 2017/0142449 A1 | 5/2017 | Ogle et al. | |
| 2017/0185277 A1 | 6/2017 | Sundermeyer et al. | |
| 2018/0084285 A1 | 3/2018 | Ogle et al. | |
| 2018/0144142 A1 | 5/2018 | Attfield et al. | |
| 2018/0249188 A1 | 8/2018 | Fang et al. | |
| 2018/0270510 A1 | 9/2018 | Fang et al. | |
| 2019/0044826 A1* | 2/2019 | Flores Guerra ......... | H04L 41/22 |
| 2019/0205511 A1 | 7/2019 | Zhan et al. | |

OTHER PUBLICATIONS

M. Z. Bjelica, I. Papp, N. Teslic and J. Coulon, "Set-top box-based home controller," IEEE International Symposium on Consumer Electronics (ISCE 2010), 2010, pp. 1-6, doi: 10.1109/ISCE.2010.5523704 (Year: 2010).*

Y. Yu, S. D. You and D. Tsai,"A Remote Surveillance Model for Appliance Control," 2010 13th International Conference on Network-Based Information Systems, Takayama, 2010, pp. 499-503, doi: 1109/NBiS.2010.64. (Year:2010).

* cited by examiner

SET-TOP BOX WITH INTERACTIVE FEATURES AND SYSTEM AND METHOD FOR USE OF SAME

PRIORITY STATEMENT & CROSS-REFERENCE TO RELATED APPLICATIONS

This application is a continuation of U.S. application Ser. No. 16/933,604, entitled "Set-Top Box with Interactive Features and System and Method for Use of Same," filed on Jul. 20, 2020, in the names of William C. Fang, et al., now U.S. Pat. No. 11,006,170, issued on May 11, 2021; which is a continuation of U.S. application Ser. No. 16/138,699, entitled "Set-Top Box with Interactive Features and System and Method for Use of Same," filed on Sep. 21, 2018, in the names of William C. Fang et al., now U.S. Pat. No. 10,721,518, issued on Jul. 21, 2020; which claims benefit of U.S. Patent Application No. 62/561,963, entitled "Set-Top Box with Interactive Features and System and Method for Use of Same," filed on Sep. 22, 2017, in the names of Vanessa Ogle et al.; all of which are hereby incorporated by reference, in entirety, for all purposes.

TECHNICAL FIELD OF THE INVENTION

This invention relates, in general, to set-top boxes and, in particular, to set-top boxes with interactive features and systems and methods for use of the same that provide additional functionality to residences, as an example.

BACKGROUND OF THE INVENTION

To many individuals, a television is more than just a display screen, rather it is a doorway to the world, both real and imaginary, and a way to experience new possibilities and discoveries. To enhance the experience, consumers are desiring televisions with enhanced features and content in an easy-to-use platform. As a result of such consumer preferences, the quality of content and ease-of-use of televisions are frequent differentiators in determining the experience. Accordingly, there is a need for improved systems and methods for providing televisions with enhanced features in an easy-to-use platform for uses in residences and other locations.

SUMMARY OF THE INVENTION

It would be advantageous to achieve a set-top box that would improve upon existing limitations in functionality. It would also be desirable to enable a computer-based electronics and software solution that would provide a television or other display with enhanced features in an easy-to-use platform in a residential environment or in another environment. To better address one or more of these concerns, a set-top box with interactive features and system and method for use of the same are disclosed. In one embodiment of the set-top box, the set-top box receives various types of set-top box data such as information about display-based interactions with the set-top box, information about multiple amenities on a residential property co-located with the set-top box, and information from a proximate wireless-enabled interactive programmable device interacting with the set-top box. The set-top box may render a map view of the property based on obtained map data. The map view may include an interactive graphical representation of the residential property and be annotated with at least a portion of the set-top box data. These and other aspects of the invention will be apparent from and elucidated with reference to the embodiments described hereinafter.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which.

DETAILED DESCRIPTION OF THE INVENTION

While the making and using of various embodiments of the present invention are discussed in detail below, it should be appreciated that the present invention provides many applicable inventive concepts, which can be embodied in a wide variety of specific contexts. The specific embodiments discussed herein are merely illustrative of specific ways to make and use the invention, and do not delimit the scope of the present invention.

Figure 1:
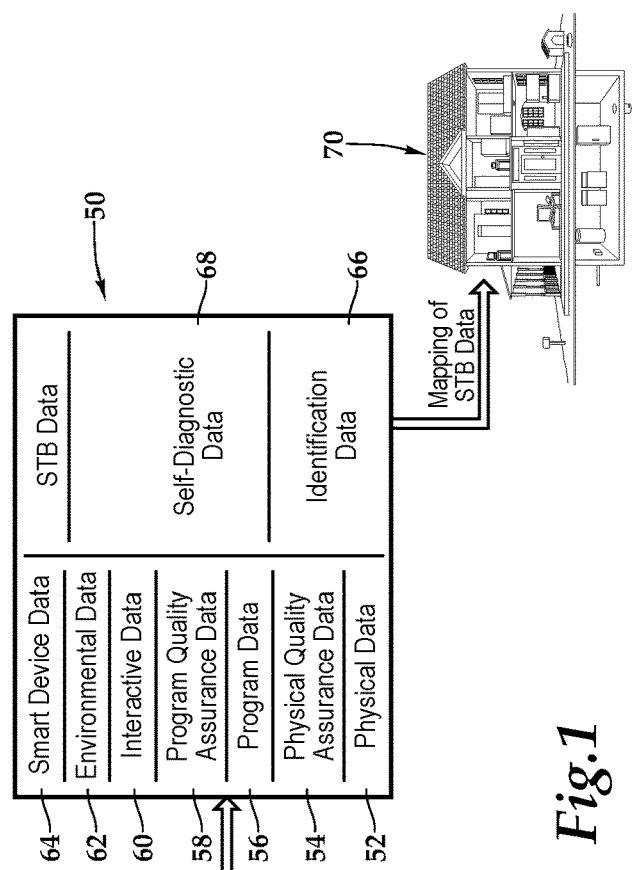
FIG. 1 is a schematic diagram depicting one embodiment of a system for providing residential property management according to the teachings presented herein.
Figure 1:
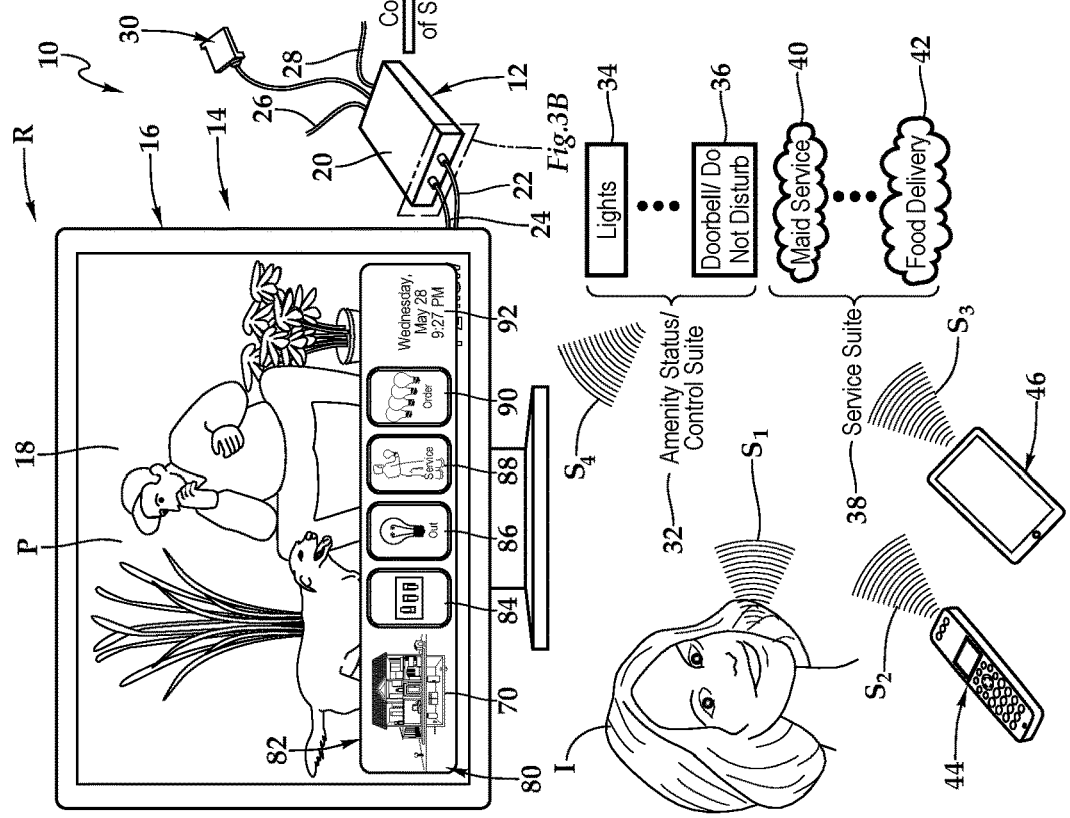

Referring initially to FIG. 1, therein is depicted one embodiment of a system 10 utilizing a set-top box 12 with enhanced interactive features. The set-top box 12 may be utilized on a residential property R, which may be a single family residence such as a house, duplex, townhome, or an apartment, for example. The set-top box 12 is located within the residential property R and is communicatively disposed with various amenities associated with the residential property R.

As illustrated, in one embodiment, within the residential property R, the system 10 includes the set-top box 12, which as part of an entertainment center 14, has a display 16 having a screen 18. The display 16 may be a television or any electronic visual display device, for example. The set-top box 12 includes a housing 20. A connection, which is depicted as an HDMI connection 22, connects the set-top box 12 at the housing 20 to the display 16. Other connections include a power cable 24 coupling the set-top box 12 to a power source, a coaxial cable 26 coupling the set-top box 12 to an external cable source, and a category five (Cat 5) cable 28 coupling the set-top box 12 to an external source. As shown, the set-top box 12 may include a dongle 30 providing particular technology and functionality extensions thereto. That is, the set-top box 12 may be a set-top box-dongle combination in one embodiment. More generally, it should be appreciated that the cabling connected to the set-top box 12 will depend on the environment and application and the cabling connections presented in FIG. 1 are depicted for illustrative purposes. Further, it should be appreciated that the positioning of the set-top box 12 will vary depending on environment and application and, with certain functionality, the set-top box 12 may be placed more discretely behind the display 16.

An amenity status/control suite 32 represents the status and control of various amenities, such as residential amenities, associated with the individual I in the residential property R. The various amenities may include lights 34, a thermostat, shades, and a doorbell 36, for example. The set-top box 12 may also be communicatively disposed with these various amenities, which may also include a CD/DVD player, and a radio tuner, for example. The set-top box 12 is communicatively disposed with all of these various amenities in the amenity status/control suite 32. A service suite 38 represents a set of services associated with the individual I living or staying in the residential property R. The various services may include maid service 40, pool service, and food delivery service 42, for example. The set-top box 12 is communicatively disposed with these various services.

In one embodiment, the individual I may issue voice commands, such as signals $S_1$, from a distance to the set-top box 12 in order to control the display 16 via the set-top box 12, for example, or interact with the amenity status/control suite 32 or the service suite 38. The set-top box 12 is also communicatively disposed with a television remote control 44 that includes an array of buttons for adjusting various settings such as television channel and volume. In one embodiment, the television remote control 44 may be a consumer infrared (IR), Bluetooth or other wireless-protocol-based device configured as a small wireless handheld object that issues commands, such as signals $S_2$, from a distance to the set-top box 12 in order to control the display 16 via the set-top box 12, for example, or interact with the amenity status/control suite 32 or the service suite 38.

A proximate wireless-enabled interactive programmable device 46 is illustrated as a tablet computer having a touch screen display. Although a tablet computer is depicted, the proximate wireless-enabled interactive programmable device 46 may be a personal computer, laptop, tablet computer, smart phone, smart speaker, or smart watch, for example. The proximate wireless-enabled interactive programmable device 46 issues commands, such as signals $S_3$, from a distance to the set-top box 12 in order to control the display 16 via the set-top box 12, for example, or interact with the amenity status/control suite 32 or the service suite 38. In one implementation, an application installed from a server enables the set-top box 12 and the proximate wireless-enabled interactive programmable device 46 to be wirelessly paired. In another embodiment, a challenge-response is utilized to wirelessly pair the set-top box 12 and the proximate wireless-enabled interactive programmable device 46.

The set-top box 12 collects various set-top box data 50 including physical data 52, physical quality assurance data 54, program data 56, program quality assurance data 58, interactive data 60, environmental data 62, and smart device data 64. Additionally, the set-top box data 50 includes identification data 66 identifying the set-top box 12 as well as self-diagnostic data 68. In one embodiment, the physical data 52 includes the actual hardware specifications and arrangement of cable connections at the time of installation. The physical quality assurance data 54 may be physical state data relating to a current condition of the hardware and cable connections. The program data 56 may include information about the system software that engages the set-top box hardware and information about the application software that provides functionality relating to the individual's interest, for example. The program quality assurance data 58 may be software state data relating to the current operations of the system software and the application software. In one embodiment, the interactive data 60 includes information about the display-based interactions of a guest with the set-top box 12. The environmental data 62 includes information about the non-display-based interactions of a guest with the set-top box 12. In one implementation, the smart device data 64 may include information from a proximate wireless-enabled interactive programmable device 46 interacting with the set-top box 12. In one implementation, the identification data 66 may include the location of the set-top box 12 as well as other information derived from the physical data 52 and the program data 56, which identifies the set-top box 12. The self-diagnostic data 68 relates to an application running automatically at a regular interval or continuously, for example, that detects faults—typically before becoming serious—in the physical data 52, the physical quality assurance data 54, the program data 56, the program quality assurance data 58, the interactive data 60, or the environmental data 62, for example.

By way of example, and not by way of limitation, the physical data 52 may be processor specifications, memory specifications, storage specifications, wireless specifications, firmware versions, connection to display by type, connection to display by model number, network addressing, MAC addresses, or the like. The physical quality assurance data 54 may be online/offline status, power state, display control status, display connection status, HDMI interface status, control interface status, memory usage, unit up-time, hardware installation progress, or the like. The program data 56 may be user interface software version, operating system version, settings version, welcome menu version, and software configuration, or the like. The program quality assurance data 58 may be program guide status, debug console log, software usage, and software installation progress, or the like. The interactive data 60 may be guest configuration data, television channel viewing, program viewing, Internet history, program guide interaction, or the like. The environmental data 62 may be amenity interaction, lighting status, thermostat status, window shades status, door status, or the like. The smart device data 64 may be geolocation data, smart apps configured to utilize the set-top box, smart app usage, or the like. The identification data 66 may be the serial number and addressing information gathered from the physical data, software identification information gathered from the program data 56 or the like. The self-diagnostic data 68 may be percent online, display output errors, High Bandwidth Digital Content Protection (HBDCP) errors, self-test results, set-top box health reports, or the like.

As will be discussed in further detail hereinbelow, a map view 70 of the residential property R may be rendered by the system 10 as part of and following the collection of the set-top box data 50. More particularly, in one operational embodiment of the system 10, as discussed, the set-top box 12 stores various types of set-top box data 50 and the set-top box 12 may render the map view 70 of the residential property R based on obtained map data, as will be discussed in more detail hereinbelow. The map view 70 may include a graphical representation of the spaces and rooms at the residential property R. The set-top box may annotate the graphical representation of the room with at least a portion of the set-top box data 50.

In one operational embodiment, in response to collecting set-top box data 50 from the set-top box, amenity status control suite 32, service suite 38, and proximate wireless-enabled interactive programmable device 46, the set-top box 12 has generated an interactive portal 80.

Alternatively, in another implementation, the Individual I may press a service button on a device, such as the television remote control 44 or the proximate wireless-enabled interactive programmable device 46, or navigate a menu to cause the generation of the interactive portal 80, which may be overlaid or superimposed on the program P on the display 16, in one embodiment, or partially or fully integrated therewith. The interactive portal 80 includes the map view 70 as well as interactive icons 82, and more particularly icons 84, 86, 88, and 90. Additionally, informational presentation 92 is provided, which includes date and time. It should be appreciated that any number or configuration of interactive icons 82 may be presented, including an entire screen of interactive icons 82 or a scrolling feature allowing a defined space to provide many sheets of interactive icons 82. By way of example and not by way of limitation, the interactive icons 82 may include status icons, control icons, and service icons relating to the map 70, including lighting, security alarm systems, garage doors, front doors, hot-water heaters, sump pumps, door bells, pet bowls, HVAC systems, and entry points, for example. Further, it should be appreciated that the map view 70 may be displayed in some embodiments independently of the interactive portal 80.

In the embodiment shown, the icon 84 provides interaction with the lighting system to control the lights in the residential property R. The icon 86, a status icon initially generated from receipt of the signal $S_4$ at the set-top box 12, which provided interactive data 60, indicates that a light bulb needs replacement in the kitchen, based on the map view 70. The icon 88 is a management icon providing for a service request, and actuation of the icon 88 by way of a voice command by the individual I, the television remote control 44, or the proximate wireless-enabled interactive programmable device 46, for example, generates, by way of the set-top box 12, a maintenance request in substantially real time. The maintenance request may be sent to household member or other individual charged with lightbulb replacement. The icon 90, in this instance, indicates that the household 90 is out of light bulbs and actuation of the icon 90, which executes a product fulfillment, orders the appropriate lightbulb from a third-party service.

As shown, the individual I views the interactive portal 80, including the map view 70 and the interactive icons 82. After viewing the map view 70, the individual I utilizes the proximate wireless-enabled interactive programmable device 46 to send an interactive instruction in the form of a command to the set-top box 12 to actuate icon 88 to order maintenance of the lightbulb by, in one implementation, adding the lightbulb replacement to a "honey-do" list or causing the set-top box 12 to send a text message to the individual responsible for lightbulb replacement.

The interactive icons 82 may be words, graphical representations or a combination of words and graphical representations, for example. In one implementation, the interactive icons 82 and informational presentation 92 may be language independent. In this manner, the set-top box 12 is providing various environmental support without the need for additional technology. Further, complex systems that require additional training are not needed as the systems and methods presented herein are intuitive.

Figure 2A:
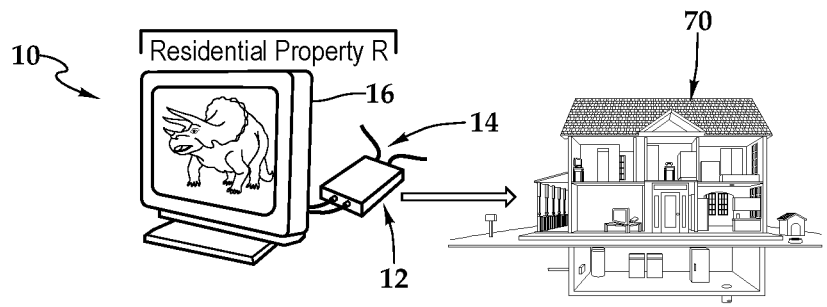
FIG. 2A is a schematic diagram depicting one embodiment of the system of FIG. 1 within an on-property deployment.
Figure 2B:
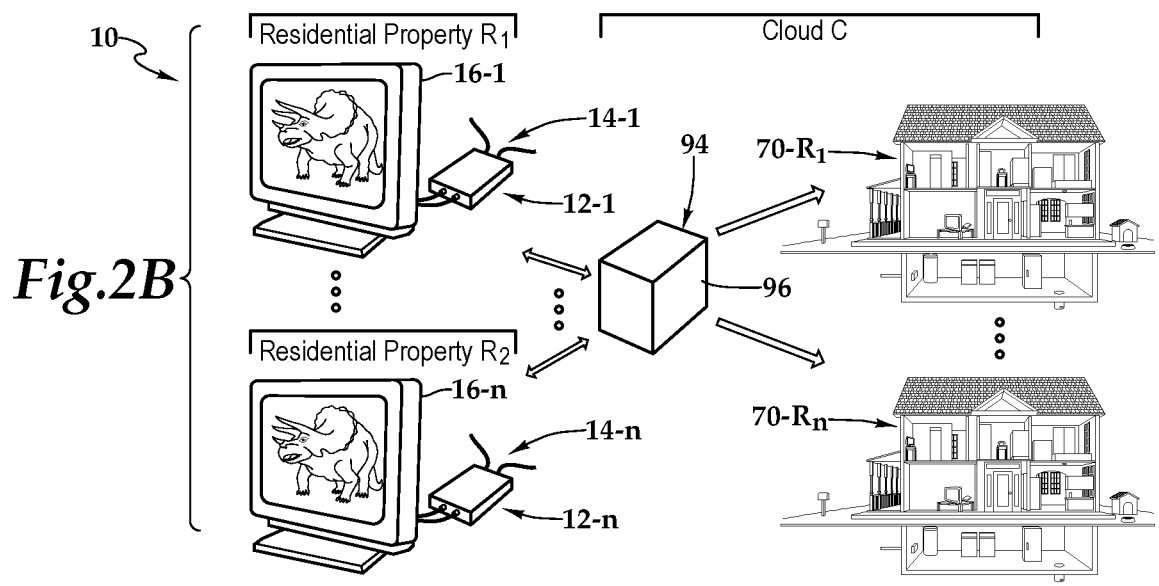
FIG. 2B is a schematic diagram depicting one embodiment of the system of FIG. 1 within a cloud-computing deployment.
Figure 3A:
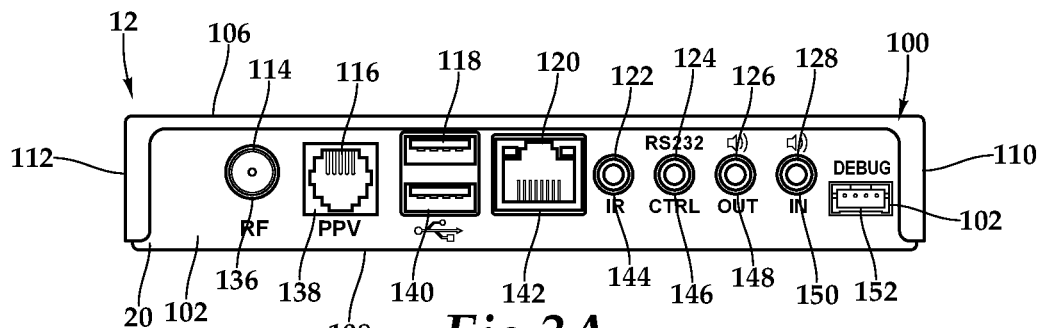
FIG. 3A is a wall-facing exterior elevation view of one embodiment of the set-top box depicted in FIG. 1 in further detail.
Figure 3B:
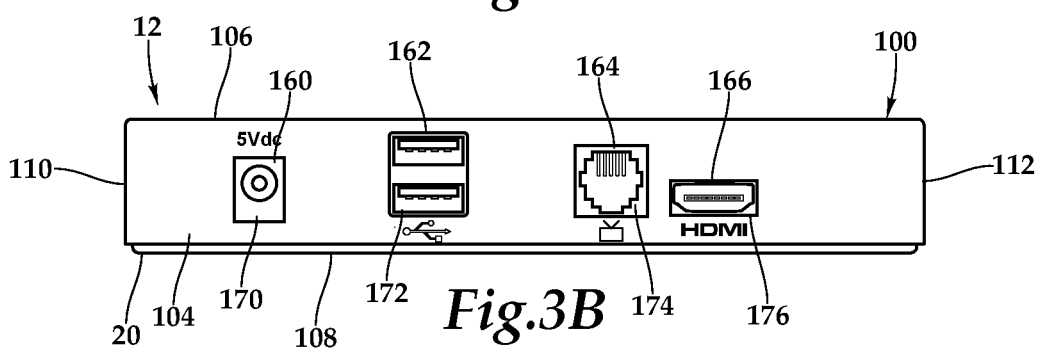
FIG. 3B is a television-facing exterior elevation view of the set-top box depicted in FIG. 1.
Figure 3C:
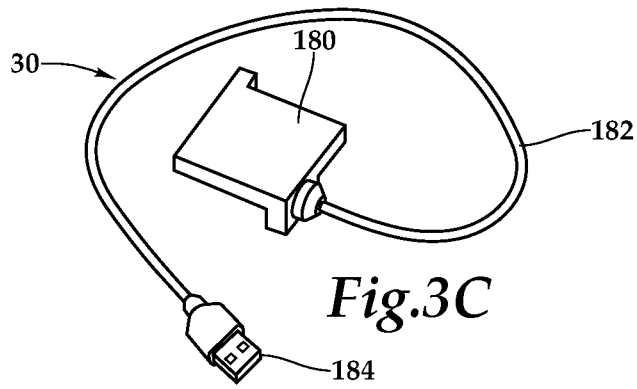
FIG. 3C is a front perspective view of a dongle depicted in FIG. 1 in further detail.
Figure 4:
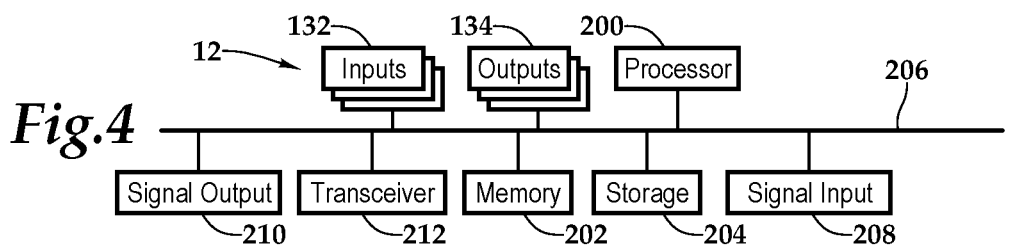
FIG. 4 is a functional block diagram depicting one embodiment of the set-top box presented in FIGS. 3A and 3B.

Referring now to FIG. 2A, the system 10 may be deployed as discussed in FIG. 1 with the set-top box 12 collecting the set-top box data 50 and generating the map view 70 based on obtained map data with annotations based on the set-top box data 50 as discussed herein. Referring now to FIG. 2B, the system 10 may be deployed such that a server 94 is located remotely with respect to the residential properties $R_1 \ldots R_n$, such as in a cloud-based deployment, shown by cloud C. As shown, each of the residential properties $R_1 \ldots R_n$ may respectively include set-top boxes 12-1 . . . 12-n, entertainment centers 14-1 . . . 14-n, and displays 16-1 . . . 16-n. As shown, the remote server 94 includes a housing 96 having various components and software therein as will be discussed in FIG. 5, FIG. 6, and FIG. 7. In one embodiment, the set-top boxes 12-1 . . . 12-n send the set-top box data 50 periodically as part of regular broadcasts or in response to an inquiry made from the remote server 94. The remote server 94 receives the set-top box data 50 from the set-top boxes 12-1 . . . 12-2.

The remote server 94 or each of the set-top boxes 12-1 through 12-n in combination with the remote server 94 may render a map view 70 of the respective residential properties $R_1 \ldots R_n$ based on obtained map data with annotations based on the set-top box data 50 as discussed herein. In some embodiments, the map view 70 may include a graphical representation of one or more rooms of the residential properties $R_1 \ldots R_n$ that are annotated with set-top box data 50 relative to the physical data 52, the physical quality assurance data 54, the program data 56, the program quality assurance data 58, the interactive data 60, the environmental data 62, the smart device data 64, the identification data 66, and/or the self-diagnostic data 68. It should be appreciated that the remote server 94 may be remotely located to serve multiple properties having multiple televisions.

Referring to FIG. 3A, FIG. 3B, FIG. 3C, and FIG. 4, as used herein, set-top boxes, back boxes and set-top/back boxes may be discussed as set-top boxes. By way of example, the set-top box 12 may be a set-top unit that is an information appliance device that generally contains set-top box functionality including having a television-tuner input and displays output through a connection to a display or television set and an external source of signal, turning by way of tuning the source signal into content in a form that can then be displayed on the television screen or other display device. Such set-top boxes are used in cable television, satellite television, and over-the-air television systems, for example.

The set-top box 12 includes the housing 20 having a panel 100 and a rear wall 102, front wall 104, top wall 106, bottom base 108, and two sidewalls 110, 112. It should be appreciated that front wall, rear wall, and side wall are relative terms used for descriptive purposes and the orientation and the nomenclature of the walls may vary depending on application. The rear wall 102 includes various ports, ports 114, 116, 118, 120, 122, 124, 126, and 128 that provide interfaces for various interfaces, including inputs 132 and outputs 134. In one implementation, as illustrated, the ports 114 through 128 include inputs 132 and outputs 134 and, more particularly, an RF input 136, an RJ-45 input 138, universal serial bus (USB) input/outputs 140, an Ethernet category 5 (Cat 5) coupling 142, an internal reset 144, an RS232 control 146, an audio out 148, an audio in 150, and a debug/maintenance port 152. The front wall 104 also includes various inputs 132 and outputs 134. More particularly, ports 160, 162, 164, and 166 include a 5V dc power connection 170, USB inputs/outputs 172, an RJ-45 coupling 174, and an HDMI port 176. It should be appreciated that the configuration of ports may vary with the set-top box 12 depending on application and context. As previously alluded to, the housing 20 may include a housing-dongle combination including, with respect to the dongle 30, a unit 180 having a cable 182 with a set-top box connector 184 for selectively coupling with the set-top box 12.

Within the housing 20, a processor 200, memory 202, storage 204, the inputs 132, and the outputs 134 are interconnected by a bus architecture 206 within a mounting architecture. It should be understood that the processor 200, the memory 202, the storage 204, the inputs 132, and the outputs 134 may be entirely contained within the housing 20 or the housing-dongle combination. The processor 200 may process instructions for execution within the computing device, including instructions stored in the memory 202 or in storage 204. The memory 202 stores information within the computing device. In one implementation, the memory 202 is a volatile memory unit or units. In another implementation, the memory 202 is a non-volatile memory unit or units. Storage 204 provides capacity that is capable of providing mass storage for the set-top box 12. Various inputs 132 and outputs 134 provide connections to and from the computing device, wherein the inputs 132 are the signals or data received by the set-top box 12, and the outputs 134 are the signals or data sent from the set-top box 12. A content signal input 208 and a content signal output 210 are also secured in the housing 20 in order to receive content from a source in the hospitality property and forward the content, including external content such as cable and satellite and pay-per-view (PPV) programing, to the display located within the residential property.

A transceiver 212 is associated with the set-top box 12 and communicatively disposed with the bus 206. As shown the transceiver 212 may be internal, external, or a combination thereof to the housing. Further, the transceiver 212 may be a transmitter/receiver, receiver, or an antenna for example. Communication between various amenities in the residential property R and the set-top box 12 may be enabled by a variety of wireless methodologies employed by the transceiver 212, including 802.11, 3G, 4G, Edge, WiFi, ZigBee, near field communications (NFC), Bluetooth low energy and Bluetooth, for example. Also, infrared (IR) may be utilized.

The memory 202 and storage 204 are accessible to the processor 200 and include processor-executable instructions that, when executed, cause the processor 200 to execute a series of operations. As will be discussed in further detail below, the processor-executable instructions, or a portion thereof, may be implemented on the set-top box 12, the remote server 94, or distributed between the set-top box 12 and remote server 94. In some embodiments, the processor-executable instructions cause the processor 200 to receive interactive data 60, environmental data 62, and smart device data 64 via the transceiver. As previously discussed, set-top box data 50 includes the interactive data 60, the environmental data 62, and the smart device data 64. The processor-executable instructions cause the processor 200 to store the set-top box data 50. Further, the processor-executable instructions may cause the processor 200 to receive and store physical data 52, physical quality assurance data 54, and program data 56. As previously discussed, the physical data 52, the physical quality assurance data 54, and the program data 56 are forms of set-top box data 50. The processor-executable instructions may cause the set-top box data 50 to be sent to the remote server 94.

The processor-executable instructions also cause the processor 200 to render a map view 70 of the residential property R based on obtained map data. The map view 70 may include an interactive graphical representation of the residential property R, the amenities, and any proximate wireless-enabled interactive programmable devices. The processor 200 is then caused to annotate the interactive graphical representation of the residential property R with at least a portion of the set-top box data 50. The processor-executable instructions cause the processor 200 to send the annotated interactive graphical representation of the residential property R to the display 16, and then receive via the transmitter an interactive instruction relative to the annotated interactive graphical representation of the residential property R.

In some embodiments, the processor-executable instructions cause the processor 200 to render a map view 70 of the residential property R based on obtained map data and the map view 70 may include a graphical representation of the residential property R. The processor-executable instructions, when executed, may cause the processor 200 to render a 3-D perspective view of the residential property R, a multi-floor view of the residential property R, a 2-D top plan view of at least a portion the residential property R, a map view 70 of a floor of the residential property R, or a map view 70 of a room of the residential property R, for example. The map view 70 may be a virtual model of at least a portion of the physical body of the residential property R, including a virtual model of the physical body of the residential property R.

In some embodiments, the processor-executable instructions cause the processor 200 to at least partially integrate or at least partially combine multiple portions of the set-top box data 50 into the graphical representation of the residential property R or room. The processor-executable instructions may also include instructions that cause the processor 200 to implement a map application configured to provide a user interface and obtain instructions, such as interactive instructions, from a user on the desired map view and annotations. Further, the processor-executable instructions may cause the map view 70 to be integrated into an interactive portal.

Figure 5:
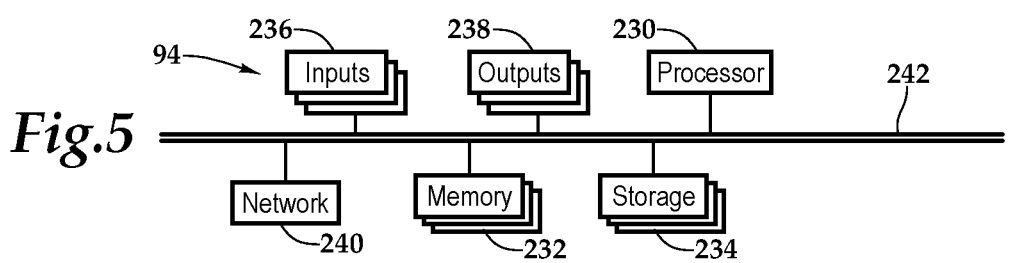
FIG. 5 is a functional block diagram depicting one embodiment of a server presented in FIGS. 2A and 2B.

Referring now to FIG. 5, one embodiment of the remote server 94 as a computing device includes a processor 230, memory 232, storage 234, inputs 236, outputs 238, and a network adaptor 240 interconnected with various buses 242 in a common or distributed, for example, mounting architecture. In other implementations, in the computing device, multiple processors and/or multiple buses may be used, as appropriate, along with multiple memories and types of memory. Further still, in other implementations, multiple computing devices may be provided and operations distributed therebetween. The processor 230 may process instructions for execution within the remote server 94, including instructions stored in the memory 232 or in storage 234. The memory 232 stores information within the computing device. In one implementation, the memory 232 is a volatile memory unit or units. In another implementation, the memory 232 is a non-volatile memory unit or units. Storage 234 includes capacity that is capable of providing mass storage for the remote server 94. Various inputs 236 and outputs 238 provide connections to and from the remote server 94, wherein the inputs 236 are the signals or data received by the remote server 94, and the outputs 238 are the signals or data sent from the remote server 94. The network adaptor 240 couples the remote server 94 to a network such that the remote server 94 may be part of a network of computers, a local area network (LAN), a wide area network (WAN), an intranet, a network of networks, or the Internet, for example.

The memory 232 and storage 234 are accessible to the processor 230 and include processor-executable instructions that, when executed, cause the processor 230 to execute a series of operations. As previously discussed, the processor-executable instructions, or a portion thereof, may be implemented on the set-top box 12, the remote server 94, or distributed between the set-top box 12 and remote server 94. In one embodiment, the processor-executable instructions cause the processor 230 to receive the set-top box data 50 from the set-top box 12 as well as receive the self-diagnostic data from the set-top box 12. The processor-executable instructions may then cause the processor 230 to store the set-top box data from the set-top box in a database, which may be associated with the storage 234. The self-diagnostic data 68 from the set-top box 12 may also be caused to be stored in the database. The processor-executable instructions then cause the processor to render a map view 70 of the residential property R based on obtained map data. As previously discussed, the map view 70 may include a graphical representation of the room and a plurality of other rooms at the hospitality establishment. The processor-executable instructions may then access the database and annotate the graphical representation of the room with at least a portion of the set-top box data 50.

In some embodiments, the processor-executable instructions cause the processor 230 to render a map view 70 of the residential property R based on obtained map data and the map view 70 may include a graphical representation of the residential property R. The processor-executable instructions, when executed, may cause the processor 230 to render a 3-D perspective view of the residential property R, a multi-floor view of the residential property R, a 2-D top plan view of at least a portion the residential property R, a map view 70 of a floor of the residential property R, or a map view 70 of a room of the residential property R, for example. The map view 70 may be a virtual model of at least a portion of the physical body of the residential property R, including a virtual model of the physical body of the residential property R.

In some embodiments, the processor-executable instructions cause the processor 230 to at least partially integrate or at least partially combine multiple portions of the set-top box data 50 into the graphical representation of the residential property R or a room within the residential property R. The processor-executable instructions may also include instructions that cause the processor 230 to implement a map application configured to provide a user interface and obtain instructions from a user on the desired map view 70 and annotations. Further, the processor-executable instructions may cause the map view 70 to be integrated into an interactive portal. The processor-executable instructions may cause the processor 230 to send the map view 70 to the set-top box 12.

Figure 6:
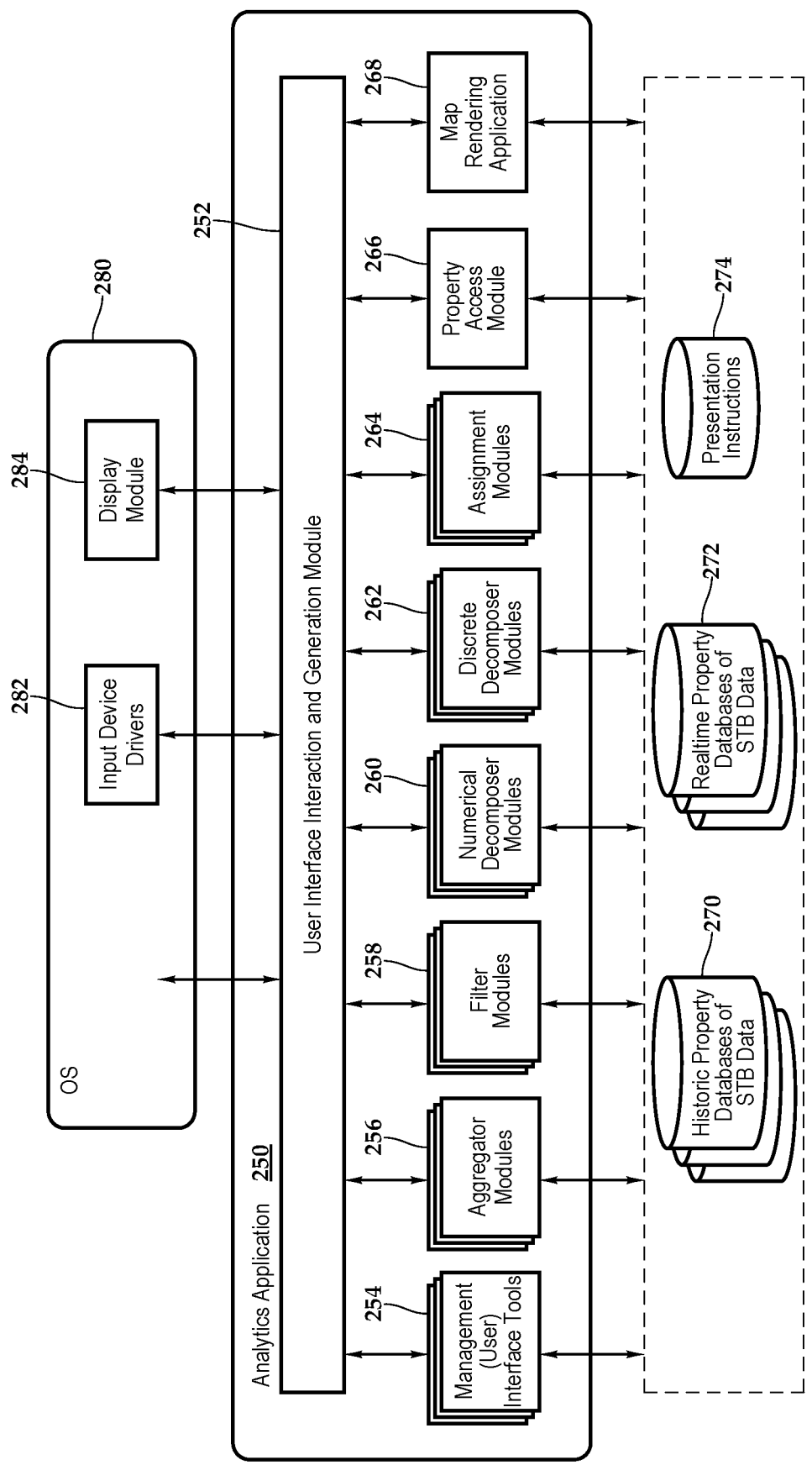
FIG. 6 is a conceptual module diagram depicting a software architecture of an analytics application of some embodiments.

FIG. 6 conceptually illustrates the software architecture of an analytics application 250 of some embodiments that may render the map view 70 of the residential property R. In some embodiments, the analytics application 250 is a stand-alone application or is integrated into another application, while in other embodiments the application 250 might be implemented within an operating system 280. In some embodiments, the analytics application 250 may be implemented within the set-top box 12. Furthermore, in some embodiments, the analytics application 250 is provided as part of a server-based solution or a cloud-based solution. In some such embodiments, the application is provided via a thin client, which may be installed on the set-top box 12. That is, the application runs on a server while a user interacts with the application via a separate machine remote from the server 94. In other such embodiments, the application is provided via a thick client, which may be installed on the set-top box 12. That is, the application is distributed from the server 94 to the client machine and runs on the client machine.

The analytics application 250 includes a user interface (UI) interaction and generation module 252, management (user) interface tools 254, aggregator modules 256, filter modules 258, numerical decomposer modules 260, discrete decomposer modules 262, assignment modules 264, property access module 266, and a map rendering application 268. The analytics application 250 has access to historic property databases of set-top box data 270, real-time property databases of set-top box data 272, and presentation instructions 274, which presents instructions from the operation of the analytics operation 250. In some embodiments, storages 270, 272, and 274 are all stored in one physical storage. In other embodiments, the storages 270, 272, 274 are in separate physical storages, or one of the storages is in one physical storage while the other is in a different physical storage.

The UI interaction and generation module 252 generates a user interface that allows the end user to specify parameters that may be utilized to generate an annotated map view of the hospitality establishment, which may include elements of a heat map. Prior to the generation of an annotated map view 70 of the hospitality establishment, the aggregator modules 256 may be executed to obtain instances of set-top box data 50. In other instances, the set-top box data 50 is continually provided to the analytics application 250 such that the aggregator modules 256 do not have to obtain instances of set-top box data 50 proactively. The set-top box data 50 may also be filtered by the filter modules 258. The aggregator modules 256 and the filter modules 258 cooperate, in combination, to gather the desired set-top box data 50.

At this time, the parameters have been established for the annotated map view 70 of the hospitality establishment by default or by an end user utilizing the management (user) interface tools 254. The numerical decomposer modules 260 may be executed to numerically decompose instances or summaries of set-top box data 50 gathered by the aggregator modules 256 and the filter modules 258 by applying the selected performance characteristic or selected performance characteristics to the instances of the set-top box data 50. The discrete decomposer modules 262 may be executed to containerize the decomposed set-top box data 50. In this manner, multiple containers may be defined that each have a range of values. The assignment modules 264 may be executed to assign a pre-map annotation element to each of the multiple containers. The property access module 266 may be executed to obtain data from the historic property databases of set-top box data 270 or the real-time property databases of set-top box data 272. The map rendering application 268 may be executed to call a map rendering application 300 of FIG. 7, for example.

In the illustrated embodiment, FIG. 6 also includes an operating system 280 that includes input device driver(s) 282 and a display module 284. In some embodiments, as illustrated, the input device drivers 282 and display module 284 are part of the operating system 280 even when the analytics application 250 is an application separate from the operating system 280. The input device drivers 282 may include drivers for translating signals from a keyboard, mouse, touchpad, tablet, touch screen, gyroscope, accelerometer or speaker, for example. A user interacts with one or more of these input devices, which send signals to their corresponding device driver. The device driver then translates the signals into user input data that is provided to the UI interaction and generation module 252.

Figure 7:
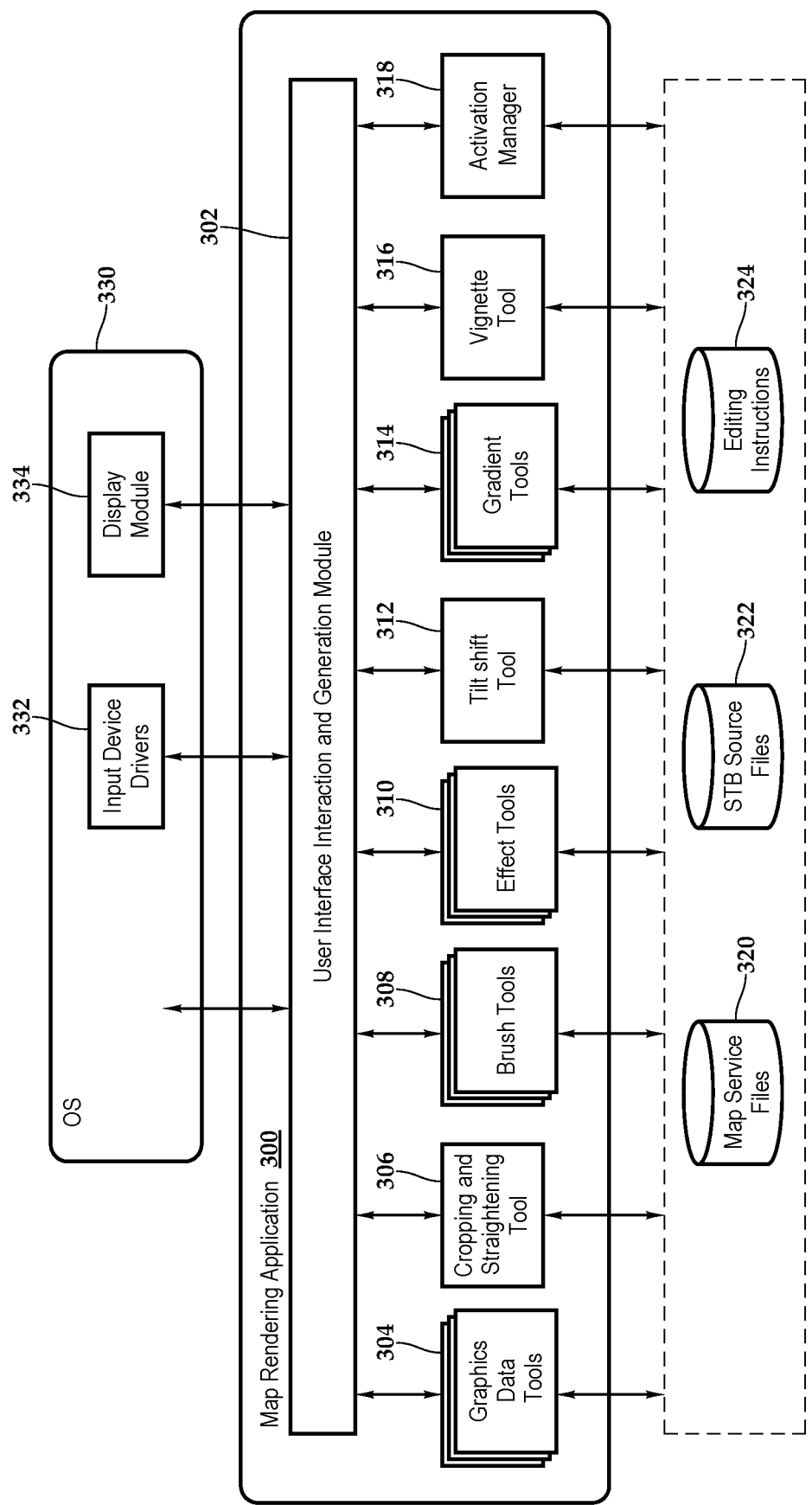
FIG. 7 is a conceptual module diagram depicting a software architecture of an image viewing, editing, and organization application of some embodiments.

FIG. 7 conceptually illustrates the software architecture of the map rendering application 300 of some embodiments that may render the map view 70 of the residential property R. In some embodiments, the map rendering application 300 is a stand-alone application or is integrated into another application, while in other embodiments the application might be implemented within an operating system. In some embodiments, the map rendering application 300 may be implemented within the set-top box 12. Furthermore, in some embodiments, the map rendering application 300 is provided as part of a server-based solution or a cloud-based solution. In some such embodiments, the application is provided via a thin client, which may be installed on the set-top box. That is, the application runs on a server while a user interacts with the application via a separate machine remote from the server. In other such embodiments, the application is provided via a thick client, which may be installed on the set-top box. That is, the application is distributed from the server to the client machine and runs on the client machine.

The map rendering application 300 includes a UI interaction and generation module 302, graphics data tools 304, a cropping and straightening tool 306, brush tools 308, effect tools 310, a tilt shift tool 312, gradient tools 314, a vignette tool 316, and an activation manager 318. The image editing application has access to map service files 320, set-top box source files 322, and editing instructions 324. In some embodiments, the map service files 320 may be vector graphics data files with texture identifiers or two or three dimensional map image files specified in one or more map tiles that may be raster-based map tiles, for example. The map service files 320 create a virtual model of the physical body of the residential property R based on definitions derived from any GIS resources, such as a geodatabase, address location map document or geoprocess model, or any two- or three-dimensional CAD-based drawings and plans as well as architectural and building plans.

The set-top box source files 322 store operational instructions for processing set-top box data 50. The editing instructions 324 store the image editing operations that the map rendering application 300 performs as a set of instructions. The map rendering application 300 uses these set of instructions to generate new images based on the original data stored in the source files. In some embodiments, the map image files and/or media content data are stored as .mov, .avi, .jpg, .png, .gif, pdf, .mp3, .bmp, .wav, .txt, .tiff, etc. files in the map service files 320 and set-top box source files 322. In some embodiments, storages 320, 322, and 324 are all stored in one physical storage. In other embodiments, the storages 320, 322, 324 are in separate physical storages, or one of the storages is in one physical storage while the other is in a different physical storage.

In the illustrated embodiment, FIG. 7 also includes an operating system 330 that includes input device driver(s) 332 and a display module 334. In some embodiments, as illustrated, the device drivers 332 and display module 334 are part of the operating system 330 even when the image editing application is an application separate from the operating system 330. The input device drivers 332 may include drivers for translating signals from a keyboard, mouse, touchpad, tablet, touch screen, gyroscope, accelerometer or speaker, etc. A user interacts with one or more of these input devices, which send signals to their corresponding device driver. The device driver then translates the signals into user input data that is provided to the UI interaction and generation module 302.

The present application describes a graphical user interface that provides users with numerous ways to perform different sets of operations and functionalities. By either executing a pre-determined series of editing instructions on a pre-determined set of media source files or receiving a selection of media processing operations, the present map rendering application 300 provides for a map view 70 of the hospitality establishment with the appropriate annotations of set-top box data 50.

Figure 8A:
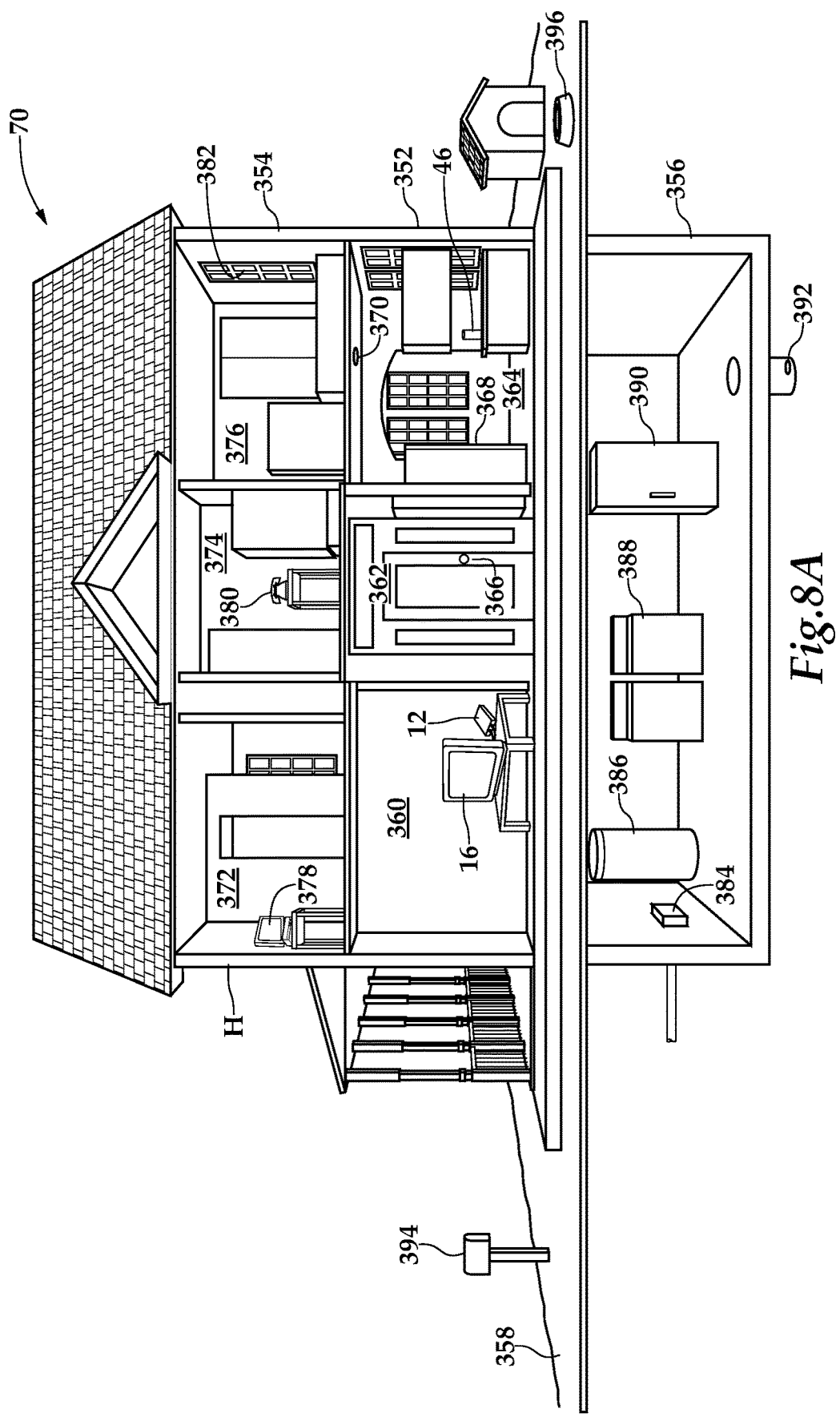
FIG. 8A is a schematic diagram depicting one embodiment of a map representation of a residential property utilizing one embodiment of the system presented herein.
Figure 8B:
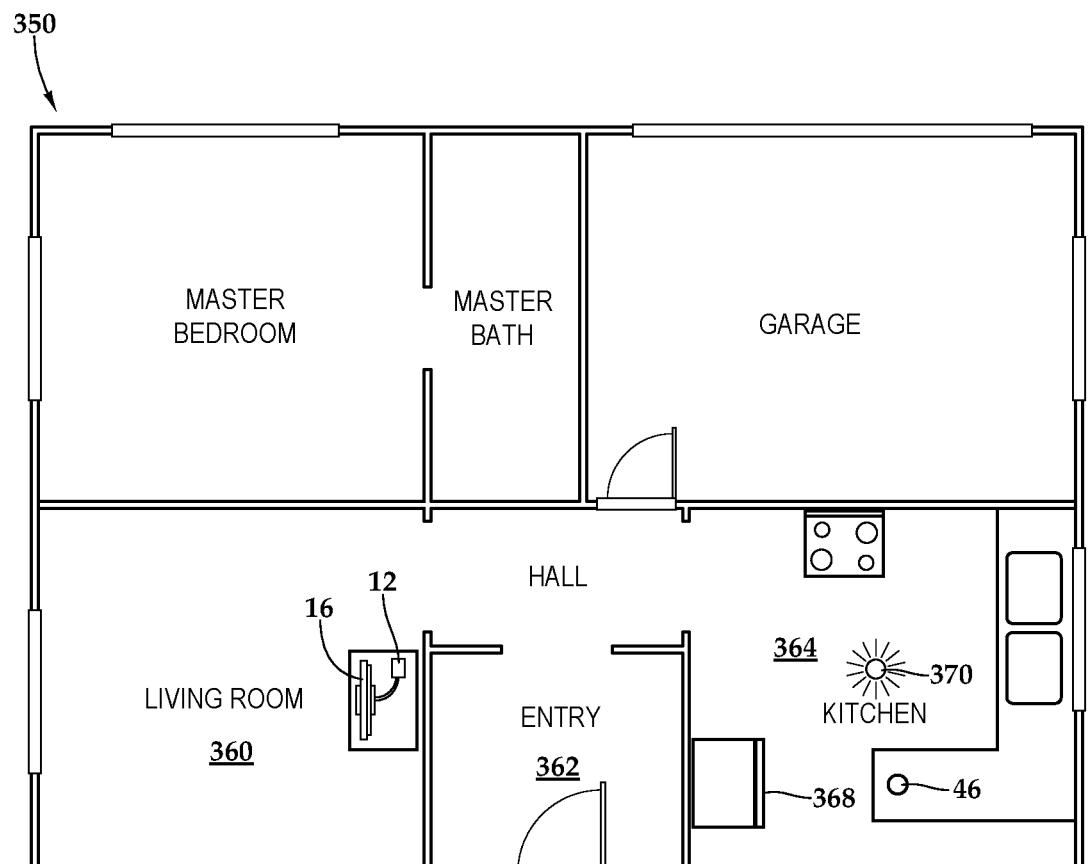
FIG. 8B is a schematic diagram depicting one embodiment of a map representation of a floor of the residential property presented in FIG. 8A.
Figure 8B:
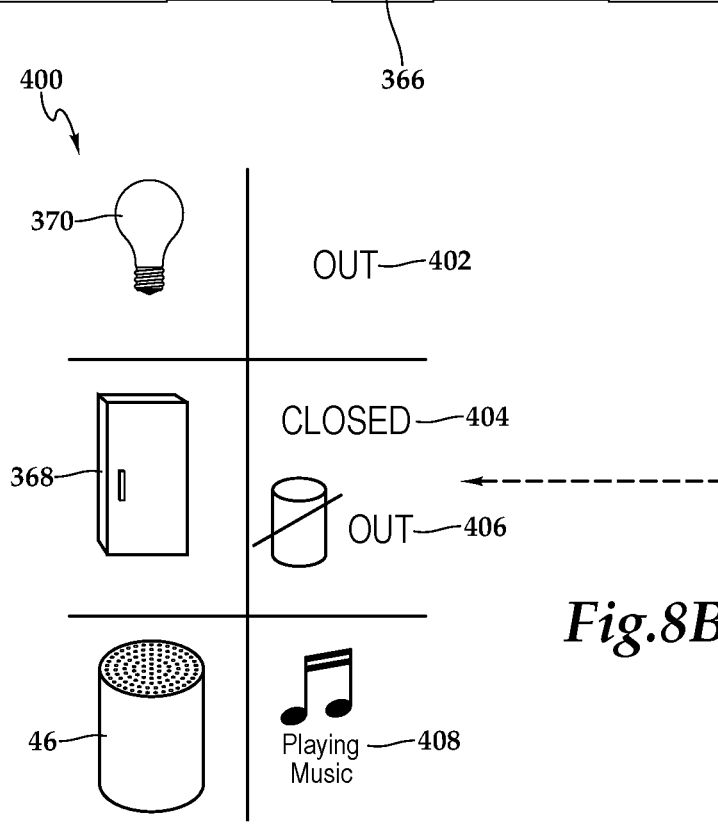

Referring now to FIG. 8A and FIG. 8B, in one implementation, residential property monitoring and optimization is provided in the form of a database, or as shown, in the map view 70 of the residential property R including a graphical presentation 350 of a floor of the residential property R, wherein particular rooms with set-top box data 50 historically and in substantially real time permits a user or manager to select the desired information and make optimal property management decisions. In particular, color-coding and hue assignment adds additional understanding and visibility into housekeeping and maintenance conditions as well as use. As shown, the residential property R which is depicted as a home H, includes a first floor 352, a second floor 354, a basement 356, and a yard 358. A living room 360, an entryway 362, and a kitchen 364 are located on the first floor 352. In the living room 360, the display 16 receives programming through the set-top box 12 which may provide cable programming or satellite programming, for example.

Sensors are associated with various household amenities throughout the first floor 352, second floor 354, basement 356, and yard 358 of the home H. The sensors may also be partially or fully integrated into the amenities. In one embodiment, each sensor or amenity is operable to transmit a wireless signal in response to an event occurrence associated with the respective household amenity, for example. As will be discussed further below, the event may be the ringing of a doorbell, the detection of water, or the detection of a low battery, for example. Further, in one embodiment, each sensor is operable to transmit a wireless signal in response to a status request or periodically. The set-top box 12 receives the wireless signals from the sensors and generates the aforementioned interactive portal 80. Such messaging provides a television viewer with the ability to monitor the status of home H and determine home awareness while engaged in watching television programming.

By way of example, the entryway 362 includes a front door 366 having a doorbell associated therewith. A sensor connected to the doorbell senses when the doorbell is rung and sends a corresponding wireless signal to the set-top box 12, which incorporates an icon representative of "DOORBELL" into the interactive portal 80. The television viewer or viewers see the icon and are aware of the ringing doorbell while watching the television in the living room 360. This is particularly useful in instances where the television viewers have the television volume excessively high or the doorbell amplifier and speaker is sufficiently removed from the living room 360.

By way of further example, the kitchen 364 includes a number of household amenities such as a refrigerator 368 that is equipped with a sensor that detects the status of the refrigerator door, i.e., open or closed. When the refrigerator door is open for more than 30 seconds, for example, a wireless signal is transmitted from the sensor to the set-top box 12. The set-top box 12 includes an icon in the interactive portal meaning "REFRIGERATOR DOOR AJAR". A light 370 is another household amenity that is located in the kitchen 364. A sensor associated with the light 370 monitors the illumination sends an appropriate wireless signal to the set-top box 12. The proximate wireless enabled interactive programmable device 46, which shown as a smart speaker, is located on a counter top in the kitchen 364 to communicate with the set-top box 12 as previously discussed.

The second floor 354 of the home H includes a study 372, a hallway 374, and a bedroom 376. As illustrated, a computer 378 is located in the study 372. A sensor associated with the computer 378 sends a wireless signal to the set-top box 12 in response to receiving an email. A telephone 380 is sitting on a stand in hallway 374. A sensor associated with the telephone 380 monitors for an incoming call and broadcasts a wireless signal in response thereto. The room 376 includes an entry point or window 382 having a sensor associated with a security system. The sensor broadcasts a wireless signal in response to the detection of broken glass or the opening of the window 382, for example.

Similarly, the basement 356 includes a number of household amenities having sensors associated therewith that send wireless signals to the set-top box 12. A water shut-off box 384, a hot water heater 386, a washer and dryer 388, a freezer 390, and a sump pump 392 each have a sensor that detects the occurrence of an event. The sensor associated with the water shut-off box 384 may detect the condition of the water valve; namely open or closed. The sensor associated with the washer and dryer 388 alerts the television viewer when a load has finished washing or drying. The sensor associated with the freezer 390 detects an ajar door and the sensor associated with the sump pump 392 broadcasts a wireless signal upon detecting the presence of water.

The amenities found in yard 358 may also include sensors. A mailbox 394 may include a sensor that detects the opening and closing of the mailbox door in order to provide an indication that mail has arrived. Additionally, a pet bowl 396 may include a sensor that detects the emptying of the food in the bowl. The household amenities described herein encompass simple mailboxes to complex security systems. Accordingly, it should be appreciated that the home H utilizing the systems presented herein permits members of the household to monitor any technology that the household is inclined to implement. In particular, the sensors may monitor household amenities relating to the environment, family comfort, utilities, appliances, and security. By way of further example, the sensors may monitor the turning ON or OFF of particular lights, power usage, the opening and closing of a garage door, the turning ON and OFF of an iron, the freezing of a pipe, the presence water leaks, the presence of gas or carbon monoxide (CO), temperature and humidity, the efficiency of an HVAC system, and the presence of smoke or fire. Additionally, the system for home awareness may provide schedule reminders, medical alerts, and the like.

It should be understood that although only one display 16, a television, is illustrated in FIGS. 8A and 8B, the systems and methods presented herein may be utilized in a multiple television or multiple display environments wherein a monitoring unit associated with each display receives all or a portion of the wireless signals from the sensors and provides the appropriate text messages. In one implementation, the computer 378 located in the study 372 is communicating with the set-top box 12 so that a user of the computer 378 is provided with home awareness.

In FIGS. 8A and 8B, by collecting the substantially real time and historic set-top box data from the residential property R, a map may be shown depicting data and information 400, for example. In particular, the kitchen 364 is highlighted to inspect the data status, which may include the physical data 52, the physical quality assurance data 54, the program data 56, the program quality assurance data 58, the interactive data 60, the environmental data 62, the smart device data 64, the identification data 66, the self-diagnostic data 68, or any subset or combination thereof. With this information and knowledge of the issue, individuals at the residential property R may appropriately administer the strategy for organizing and coordinating the resources of the property. As mentioned, it should be appreciated that other types of databases and charts may be prepared from the substantially real-time information collected.

As shown, the graphical representation 350 of the kitchen 364 is annotated with the data and information 400. For example, the data and information 400 shows the status indicator 402 of the kitchen light 370 as OUT and needing replacement, the refrigerator 368 has a closed door and sodas are out as indicated by status indicators 404, 406, and the smart device 46 is playing music as shown by status indicator 408. Residents use the map view 70 to gather real time information about the status of the residential property R and reports on any failures, for example. To view the set-top box data 50 captured by the set-top box 12 in each room or part of the residential property R, the map view users can select a room from the map and appropriately click or tap on the rooms and then select the set-top box data 50 or other processing operations requested.

The system 10 presented herein provides for the management of residential property R. In one embodiment, an onsite or web-hosted, cloud-based property monitoring and troubleshooting tool is furnished that provides a graphical presentation 350 of the residential property R with historic and real time room status. By way of example and not by way of limitation, the user may select to annotate the map view 70 with rooms and amenities online/offline, rooms and amenity status.

Figure 9:
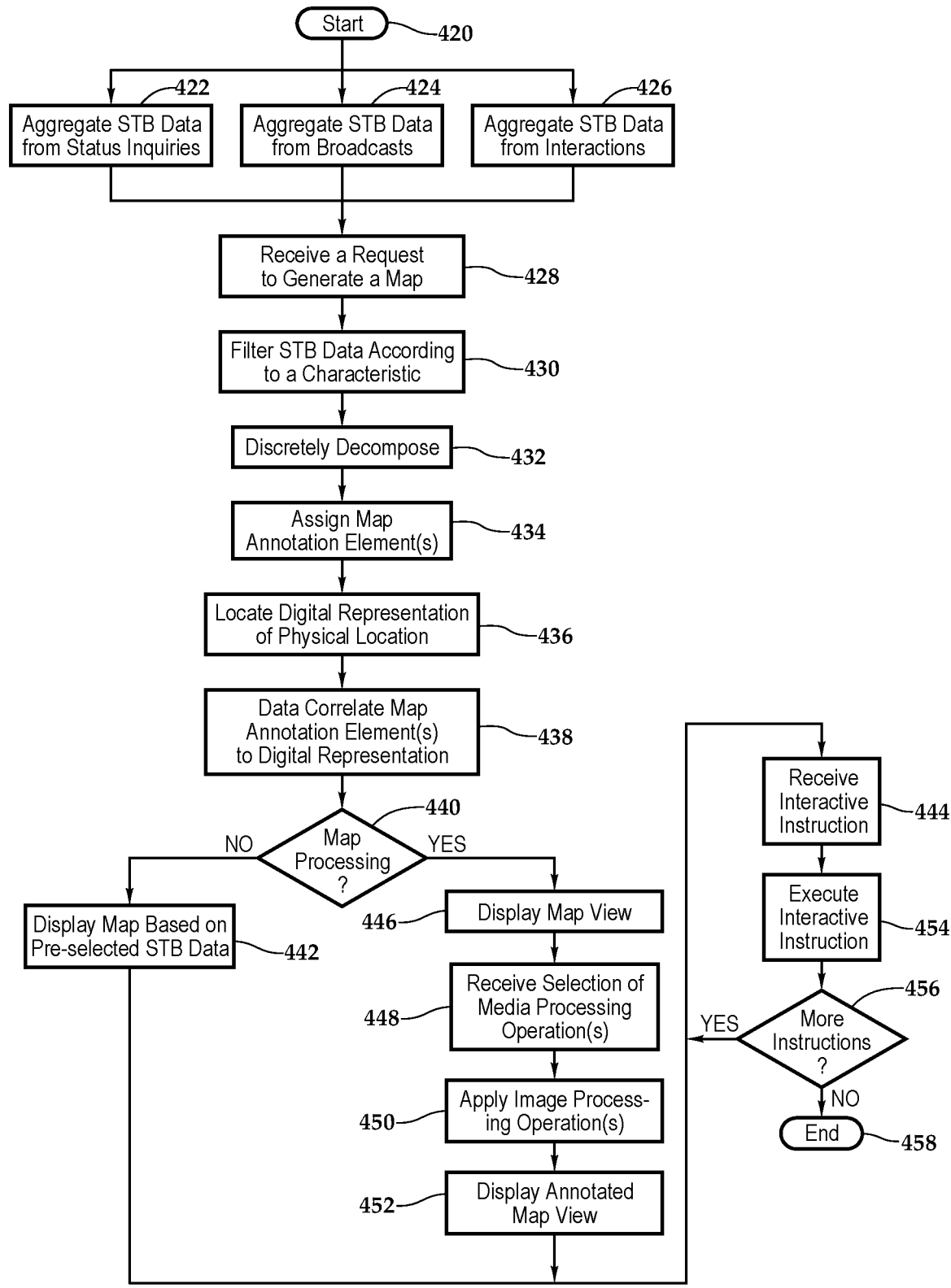
FIG. 9 is a flow chart depicting one embodiment of a method for providing a set-top box with interactive features according to the teachings presented herein.

Referring now to FIG. 9, one embodiment of a method for utilizing property management tools for the operation, control, and oversight of residential properties, for example, is depicted. The methodology starts at block 420 and progresses through blocks 422, 424, and 426 where, respectively set-top box data 50 is aggregated from status inquiries, broadcasts, and interactions with various amenities for example. At block 428, the set-top box receives a request to generate a map view of the residential property R. At block 430, the aggregated set-top box data is filtered according to a characteristic or characteristics. At blocks 432 and 434, the set-top box data 50 is discretely decomposed and assigned annotation elements. At block 436, the digital representation of the physical location, e.g., the residential property R, is located and at block 438, the data correlation of the map annotation elements to the digital representation occurs.

At decision block 400, if the map processing including any applied annotations are based on a pre-selected or pre-stored or pre-defined criteria, then the methodology advances to block 442 where the appropriate map view is rendered prior to block 444, where the methodology continues. On the other hand, at decision block 440, if user input will be sought on the map view and annotations, then the methodology displays the map view at block 446. Then at block 448, the server receives selection of media processing operations from the user and then applies the image processing operations at block 450. The media processing operations may include, for example, selecting the media to be displayed and various luminance and color properties and such to provide further visibility into the map view. At block 452, the map view with annotations is rendered prior to the methodology continuing at block 444. At block 444, the set-top box receives an interactive instruction based on the map view and executes the instruction at block 454. At decision block 456, if there are more interactive instructions then the methodology returns to block 444, otherwise the methodology concludes at block 458.

The order of execution or performance of the methods and data flows illustrated and described herein is not essential, unless otherwise specified. That is, elements of the methods and data flows may be performed in any order, unless otherwise specified, and that the methods may include more or less elements than those disclosed herein. For example, it is contemplated that executing or performing a particular element before, contemporaneously with, or after another element are all possible sequences of execution.

While this invention has been described with reference to illustrative embodiments, this description is not intended to be construed in a limiting sense. Various modifications and combinations of the illustrative embodiments as well as other embodiments of the invention, will be apparent to persons skilled in the art upon reference to the description. It is, therefore, intended that the appended claims encompass any such modifications or embodiments.

What is claimed is:

1. A set-top box comprising:
    a housing securing a signal input, a signal output, a processor, memory, storage, and a wireless transceiver therein;
    a busing architecture communicatively interconnecting the signal input, the signal output, the processor, the memory, the storage, and the wireless transceiver therein;
    the signal input configured to receive a source signal from an external source;
    the signal output configured to forward a fully tuned signal to a display; and
    the memory accessible to the processor, the memory including processor-executable instructions that, when executed, cause the processor to:
        receive interactive data at the set-top box via the set-top box, the interactive data being, relative to the set-top box, information about display-based interactions with the set-top box,
        receive environmental data via the wireless transceiver, the environmental data being, relative to the set-top box, information about an amenity, the amenity being one of a plurality of amenities at a residential property, the set-top box being co-located at the residential property,
        store set-top box data at the set-top box, the set-top box data including the interactive data and the environmental data,
        maintain the set-top box data at the set-top box,
        render a map view of the residential property at the set-top box, the map view of the residential property based on obtained map data, the map view including an interactive graphical representation of the residential property and the plurality of amenities,
        annotate the interactive graphical representation of the residential property at the set-top box with at least a portion of the set-top box data, and
        send the annotated interactive graphical representation of a residential property to the proximate wireless-enabled interactive device.

2. The set-top box as recited in claim 1, wherein the residential property is selected from the group consisting of single-family homes, duplexes, townhomes, and apartments.

3. The set-top box as recited in claim 1, wherein the processor-executable instructions further comprise processor-executable instructions that, when executed, cause the processor to render a 3-D perspective view of the residential property.

4. The set-top box as recited in claim 1, wherein the processor-executable instructions further comprise processor-executable instructions that, when executed, cause the processor to render a multi-floor view of the residential property.

5. The set-top box as recited in claim 1, wherein the processor-executable instructions further comprise processor-executable instructions that, when executed, cause the processor to render a 2-D top plan view of at least a portion of the residential property.

6. The set-top box as recited in claim 1, wherein the processor-executable instructions further comprise processor-executable instructions that, when executed, cause the processor to render a map view of a room of the residential property.

7. The set-top box as recited in claim 1, wherein the processor-executable instructions further comprise processor-executable instructions that, when executed, cause the processor to store physical data, the physical data being, relative to the set-top box, specifications of hardware and cable connection arrangements at the time of installation.

8. The set-top box as recited in claim 1, wherein the processor-executable instructions further comprise processor-executable instructions that, when executed, cause the processor to store physical quality assurance data, the physical quality assurance data being, relative to the set-top box, physical state data of a current condition of hardware and cable connections.

9. The set-top box as recited in claim 1, wherein the processor-executable instructions further comprise processor-executable instructions that, when executed, cause the processor to store program data, the program data being, relative to the set-top box, information about system software and application software.

10. The set-top box as recited in claim 1, wherein the processor-executable instructions further comprise processor-executable instructions that, when executed, cause the processor to store program quality assurance data, the program quality assurance data being, relative to the set-top box, software state data of current operations of system software and application software.

11. The set-top box as recited in claim 1, wherein the set-top box data further comprises identification data, the identification data including a location of the set-top box and information derived from physical data and program data.

12. The set-top box as recited in claim 1, wherein the set-top box data further comprises self-diagnostic data, the self-diagnostic data being information relative to faults in physical data, physical quality assurance data, program data, program quality assurance data, the interactive data, and the environmental data.

13. The set-top box as recited in claim 1, wherein the interactive data is selected from the group consisting of guest configuration data, television channel viewing, program viewing, Internet history, and program guide interaction.

14. The set-top box as recited in claim 1, wherein the environmental data is selected from the group consisting of amenity interaction, lighting status, thermostat status, window shades status, and door status.

15. The set-top box as recited in claim 1, wherein the smart device data is data received from a device selected from the group consisting of personal computers, laptops, smart phones, tablets, smart speakers, and smart watches.

16. The set-top box as recited in claim 1, wherein the housing further comprises a housing-dongle combination securing the signal input, the signal output, the processor, the memory, the storage, and an active sound control circuit portion therewith.

17. The set-top box as recited in claim 16, wherein the processor and the memory are distributed through the housing-dongle combination.

18. The set-top box as recited in claim 1, wherein the display is selected from the group consisting of televisions and electronic visual display devices.

19. A set-top box comprising:
a housing securing a signal input, a signal output, a processor, memory, storage, and a wireless transceiver therein;
a busing architecture communicatively interconnecting the signal input, the signal output, the processor, the memory, the storage, and the wireless transceiver therein;
the signal input configured to receive a source signal from an external source;
the signal output configured to forward a fully tuned signal to a display; and
the memory accessible to the processor, the memory including processor-executable instructions that, when executed, cause the processor to:
receive interactive data at the set-top box via the set-top box, the interactive data being, relative to the set-top box, information about display-based interactions with the set-top box,
receive environmental data via the wireless transceiver, the environmental data being, relative to the set-top box, information about an amenity, the amenity being one of a plurality of amenities at a residential property, the set-top box being co-located at the residential property,
store set-top box data at the set-top box, the set-top box data including the interactive data"," and the environmental data,
maintain the set-top box data at the set-top box,
render a map view of the residential property at the set-top box, the map view of the residential property based on obtained map data, the map view including an interactive graphical representation of the residential property and the plurality of amenities,
annotate the interactive graphical representation of the residential property at the set-top box with at least a portion of the set-top box data, and
send at least a portion of the annotated interactive graphical representation of the residential property to a proximate wireless-enabled interactive device.

20. A set-top box comprising:
a housing securing a signal input, a signal output, a processor, memory, storage, and a wireless transceiver therein;
a busing architecture communicatively interconnecting the signal input, the signal output, the processor, the memory, the storage, and the wireless transceiver therein;
the signal input configured to receive a source signal from an external source;
the signal output configured to forward a fully tuned signal to a display; and
the memory accessible to the processor, the memory including processor-executable instructions that, when executed, cause the processor to: receive interactive data at the set-top box via the set-top box, the interactive data being, relative to the set-top box, information about display-based interactions with the set-top box,
receive environmental data via the wireless transceiver, the environmental data being, relative to the set-top box, information about an amenity, the amenity being one of a plurality of amenities on a residential property co-located with the set-top box,
store set-top box data at the set-top box, the set-top box data including the interactive data and the environmental data,
maintain the set-top box data at the set-top box,
render a map view of the residential property at the set-top box, the map view of the residential property based on obtained map data, the map view including an interactive graphical representation of the residential property and the plurality of amenities,
annotate the interactive graphical representation of the residential property at the set-top box with at least a portion of the set-top box data,
send via the wireless transmitter at the set-top box the annotated interactive graphical representation of the residential property to a proximate wireless-enabled interactive programmable device, and
receive via the wireless transmitter at the set-top box an interactive instruction relative to the annotated interactive graphical representation of the residential property.

* * * * *